US012128957B2

(12) United States Patent
Berardi

(10) Patent No.: US 12,128,957 B2
(45) Date of Patent: Oct. 29, 2024

(54) FLOATING SKID PLATE FOR VEHICLE

(71) Applicant: XTravel Suspension, LLC, Rancho Santa Fe, CA (US)

(72) Inventor: Nestor Alexander Berardi, Temecula, CA (US)

(73) Assignee: XTravel Suspension, LLC, Southlake, TX (US)

( * ) Notice: Subject to any disclaimer, the term of this patent is extended or adjusted under 35 U.S.C. 154(b) by 222 days.

(21) Appl. No.: 17/666,899

(22) Filed: Feb. 8, 2022

(65) Prior Publication Data

US 2022/0250691 A1  Aug. 11, 2022

Related U.S. Application Data

(60) Provisional application No. 63/200,002, filed on Feb. 8, 2021.

(51) Int. Cl.
B62D 25/20 (2006.01)
(52) U.S. Cl.
CPC ................. B62D 25/2072 (2013.01)
(58) Field of Classification Search
CPC ............ B62D 25/2072; B60G 2204/4308
USPC .......................................... 280/770
See application file for complete search history.

(56) References Cited

U.S. PATENT DOCUMENTS

| | | | |
|---|---|---|---|
| 4,753,456 A | 6/1988 | Booher | |
| 5,954,405 A * | 9/1999 | Toman | B60R 11/00 296/180.1 |
| 9,415,650 B2 * | 8/2016 | Bromme | B60T 5/00 |
| 9,643,664 B2 * | 5/2017 | Tesch | B62D 35/02 |
| 9,855,984 B2 | 1/2018 | Tesch et al. | |
| 9,902,225 B2 | 2/2018 | Riegelsberger et al. | |
| 10,479,423 B2 | 11/2019 | Seidler et al. | |
| 2015/0274216 A1 * | 10/2015 | Van Dyke | B60B 35/006 280/770 |
| 2019/0225041 A1 | 7/2019 | Upah et al. | |
| 2020/0239069 A1 | 7/2020 | Gordon | |
| 2021/0078652 A1 * | 3/2021 | Bösl | B60G 7/001 |

FOREIGN PATENT DOCUMENTS

| | | |
|---|---|---|
| CN | 102910034 A | 2/2013 |
| CN | 110979458 A | 4/2020 |
| DE | 102010018779 A1 | 11/2010 |
| DE | 102016109896 A1 * | 11/2017 |
| EP | 2476565 B1 | 7/2013 |
| JP | H0637090 U | 5/1994 |
| KR | 1020070084444 A | 8/2007 |

* cited by examiner

Primary Examiner — John D Walters
(74) Attorney, Agent, or Firm — Ryan Dean; Umberg Zipser LLP

(57) ABSTRACT

Movable skid plates for a vehicle are described that are configured to move in response to movement of a first or second link to which the skid plate is coupled. Preferred vehicles comprise a multi-link suspension system having a plurality of links, at least some of which can move independently of one another. The skid plate is preferably disposed below the two bottom links of the suspension system. The skid plate can be fixedly attached to one of the two bottom links. The skid plate can be coupled to the other of the two bottom links such that the skid plate can move with respect to that link.

17 Claims, 5 Drawing Sheets ns shown in the figures, the skid plate is movably coupled to one of the links while being fixedly attached to the other of the links (or to a mount that is attached to the link).

FLOATING SKID PLATE FOR VEHICLE

This application claims priority to U.S. provisional patent application No. 63/200,002 filed on Feb. 8, 2021. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is skid plates for vehicles.

BACKGROUND

The following description includes information that may be useful in understanding the present invention. It is not an admission that any of the information provided herein is prior art or relevant to the presently claimed invention, or that any publication specifically or implicitly referenced is prior art.

Many off-road and other vehicles include skid plates that typically protect or shield vehicle components on the front-end, underside areas of the vehicle. These components are typically located in a lower area of the vehicle and are susceptible to being impacted from debris or objects when the vehicle is driven or moved. The skid plate thereby acts as a shield to protect these components. However, as the suspension of the vehicle travels during motion of the vehicle, the skid plate generally moves with the suspension and may become less effective.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems, and methods for suspension systems for vehicles. Vehicles could model or remote-controlled vehicles such as radio-controlled cars, trucks or other vehicles, autonomous vehicles, or passenger vehicles such as automobiles, trucks, all-terrain vehicles, snowmobiles, and any other vehicle that requires a skid plate.

Preferred skid plates for vehicles with a multi-link suspension system are coupled to at least first and second links of the suspension system such that the skid plate can move with respect to at least one of the first and second links. The skid plate may have at least one aperture, which in some embodiments comprises a slot. A fastener can be inserted through the aperture or slot and attached to one of the first and second links or a mount attached to the link. In this manner as one or both of the first and second links move, the skid plate will move relative to the link to which it is coupled via the aperture or slot. It is contemplated that movement of the skid plate is restricted by movement of the first fastener along the slot.

The skid plate is preferably permanently affixed to the other of the first and second links such that the skid plate fixed in place relative to the other link. In this manner, and as shown in the figures, the skid plate is movably coupled to one of the links while being fixedly attached to the other of the links (or to a mount that is attached to the link).

Various objects, features, aspects, and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As discussed above, the inventive subject matter comprises a skid plate that is preferably mounted to two lower links of a suspension system of a vehicle. Preferred vehicles comprise a chassis to which the suspension system can be coupled. Such suspension systems preferably comprise a multi-link suspension system, where each of the links can move independently of the other links. Because the links may each move independently, traditional skid plates will not function appropriately. Exemplary multi-link suspension systems are described in U.S. patent application having Ser. No. 17/144,654, filed on Jan. 8, 2021 (now U.S. Pat. No. 11,192,414) and U.S. patent application having Ser. No. 17/499,778, filed on Oct. 12, 2021.

Figure 1:
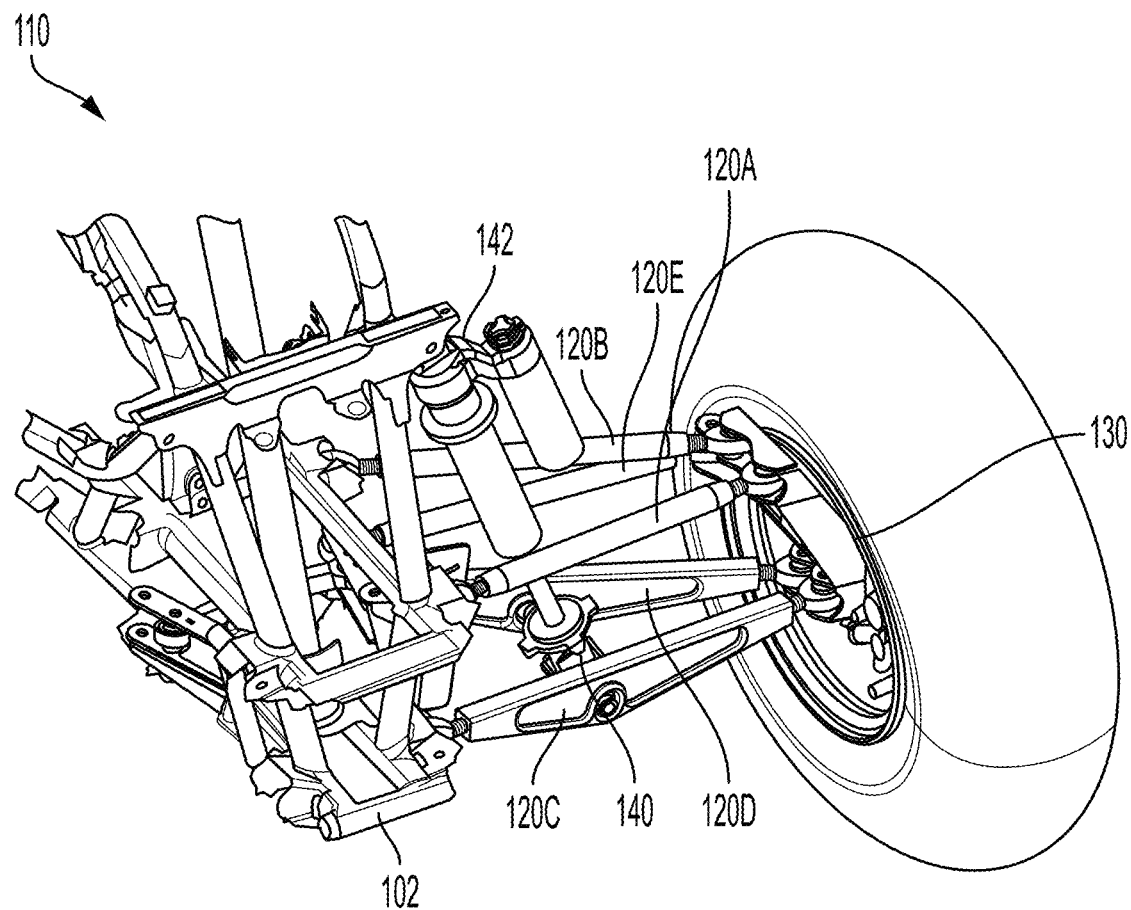
FIG. 1 is a schematic of a multi-link suspension system.

A preferred suspension system 110 comprises a plurality of links that couple a chassis 102 of the vehicle to a knuckle 130, such as shown in FIG. 1. The plurality of links preferably comprises (i) a first link 120A that couples to a first point on an upper portion of the knuckle 130 at a first end and the chassis 102 of the vehicle at a second end; (ii) a second link 120B that couples to a second point on the upper portion of the knuckle 130 at a first end independent of the first link 120A, and that couples to the chassis 102 of the vehicle at a second end independent of the first link 120A; (iii) a third link 120C that couples to a third point on a lower portion of the knuckle 130 at a first end and the chassis 102 of the vehicle at a second end; and (iv) a fourth link 120D that couples to a fourth point on the lower portion of the knuckle 130 at a first end and the chassis 102 of the vehicle at a second end.

Each of the links 120A-120D preferably attaches to the knuckle 130 at a distinct point, meaning that each of the links 120A-120D attaches to the knuckle 130 at distinct and separate locations from the others. This is in contrast to the V-type suspension systems of the prior art where two or more links connect to the knuckle at a single point. It is also preferred that each of the links 120A-120D attaches to the vehicle's chassis 102 at a distinct point. It is contemplated that each of the links 120A-120D couples to the knuckle 130 via a spherical ball joint, such that each of the links 120A-120D can move or pivot independently of the other links.

In some embodiments, the suspension system 110 may comprise four independent links to couple the knuckle with the chassis, with two lower links 120C-120D (front and back) and two upper links 120A-120B (front and back). In such embodiments, it is preferred that each of the links 120A-120D are mounted at distinct points to the knuckle 130 and chassis 102 and are mounted to allow each of the links 120A-120D to move or pivot independently of the other links. It is further contemplated that a fifth (steering) link 120E could be used to connect the steering column to the knuckle 130 to thereby allow for steering of the vehicle. The fifth link 120E is also preferably mounted to the knuckle 130 at a distinct location and independently of the other four links 120A-120D.

The first link 120A and the third link 120C connect a front portion of the knuckle 130 to the chassis 102 of the vehicle, and the second link 120B and the fourth link 120D connects a rear portion of the knuckle 130 to the chassis 102. Each of the first, second, third and fourth links 120A-120D can be connected to the knuckle 130 independent of one another and move and pivot independently of one another. In addition, each of the first, second, third and fourth links comprises a load-bearing arm to allow forces encountered by the wheel and knuckle to be distributed among the links.

A shock assembly 142 is connected at a first end to the spring and damper link 140. In some embodiments, the spring and damper link 140 may comprise a basket that receives the shock assembly 142. Preferably, the spring and damper link 140 is extensible such that the spring and damper link 140 can accommodate for the motion of the suspension system 110 including both steering motion and the change in position of the links 120C, 120D as the vehicle travels over bumps and undulations of the road or other surface. It is contemplated that the spring and damper link 140 can be telescoping and/or rotatably extensible. As used herein, rotatably extensible is used to mean that the link can rotate at both ends relative to links 120C, 120D to effectively be extensible and accommodate the change in position of the links 120C, 120D without necessitating a telescoping member. While the spring and damper link 140 is attached to a lower portion near the center of the links 120C, 120D, and the links 120C, 120D can both rotate along their length freely to allow the off centerline articulation of the spring and damper link 140 mounted with spherical bearings at each end, as needed to perform the rotatably extensible functionality. In a different yet related embodiment, it is contemplated that only one of link 120C or 120D would need to be configured to exhibit rotatable extensible behavior with an off axis connection point, and the other of the two links could have on axis connection to the spring and damper link 140.

To allow steering of the vehicle, the suspension system 110 comprises a fifth link 120E that couples to the knuckle 130 at a first end and the steering system of the vehicle at a second end.

As discussed below, a skid plate can be mounted to the two lower links 120C, 120D on each side of the front suspension of the vehicle, such that the skid plate extends below the two lower links 120C, 120D.

FIGS. 2A-2F illustrates one embodiment of a skid plate 260 used with a multi-link suspension system 200 including, for example, the suspension system discussed above. The suspension system preferably comprises a plurality of links that couple a chassis of a vehicle to a knuckle 230.

In preferred embodiments, the plurality of links comprises (i) a first link 220A that couples to a first point on an upper portion of the knuckle 230 at a first end and the chassis of the vehicle at a second end; (ii) a second link 220B that couples to a second point on the upper portion of the knuckle 230 at a first end independent of the first link 220A, and that couples to the chassis of the vehicle at a second end independent of the first link 220A; (iii) a third link 220C that couples to a third point on a lower portion of the knuckle 230 at a first end and the chassis of the vehicle at a second end; and (iv) a fourth link 220D that couples to a fourth point on the lower portion of the knuckle 230 at a first end and the chassis of the vehicle at a second end. Thus, the suspension system 210 may comprise four independent links to couple the knuckle 230 with the vehicle's chassis, with two lower links 220C-220D (front and back) and two upper links 220A-220B (front and back). In such embodiments, it is preferred that each of the links 220A-220D are mounted at distinct points to the knuckle 230 and the chassis and are mounted to allow each of the links 220A-220D to move or pivot independently of the other links. However, it is alternatively contemplated that some of the links (e.g., the first and second links) could comprise an A-arm or other configuration where the two links move together rather than independently of one another.

Each of the links 220A-220D preferably attaches to the knuckle 230 at a distinct point, meaning that each of the links 220A-220D attaches to the knuckle 230 at distinct and separate locations from the others. This is in contrast to the V-type suspension systems of the prior art where two or more links connect to the knuckle at a single point. It is also preferred that each of the links 220A-220D attaches to the vehicle's chassis at a distinct point. It is contemplated that each of the links 220A-220D may couple to the knuckle 230 via a spherical ball joint, such that each of the links 220A-220D can move or pivot independently of the other links.

It is further contemplated that a fifth (steering) link 220E could be used to connect the steering column to the knuckle 230 to thereby allow for steering of the vehicle. The fifth link 220E is also preferably mounted to the knuckle 230 at a distinct location and independently of the other four links 220A-220D.

As discussed above, a spring and damper link 240 may be disposed between two of the links (here, the upper two links 220A, 220B). A shock assembly may be connected at a first end to the spring and damper link 240. Preferably, the spring and damper link 240 is extensible such that the spring and damper link 240 can accommodate for the motion of the suspension system 210 including both steering motion and the change in position of the links 220A, 220B as the vehicle travels over bumps and undulations of the road or other surface. It is contemplated that the spring and damper link 240 can be telescoping and/or rotatably extensible. As used herein, rotatably extensible is used to mean that the link can rotate at both ends relative to links 220C, 220D to effectively be extensible and accommodate the change in position of the links 220C, 220D without necessitating a telescoping member.

The skid plate 260 is preferably composed of a durable material such as steel, sheet metal, aluminum, plastic/polymer materials including ultra-high molecular weight plastic, fiberglass, and other commercially suitable material(s) and/or combination(s) thereof, so long as the skid plate has sufficient strength to withstand repeated impact with debris such as stones, rocks, gravel mud, improvised explosive devices, or any other materials encountered during off-road or other usage of the vehicle.

The skid plate 260 is preferably disposed below the two lower links 220C, 220D. Preferably, the skid plate 260 is fixed in place to one of the two lower links 220C, 220D, and slidably coupled to the other of the two lower links 220C, 220D.

Figure 2A:
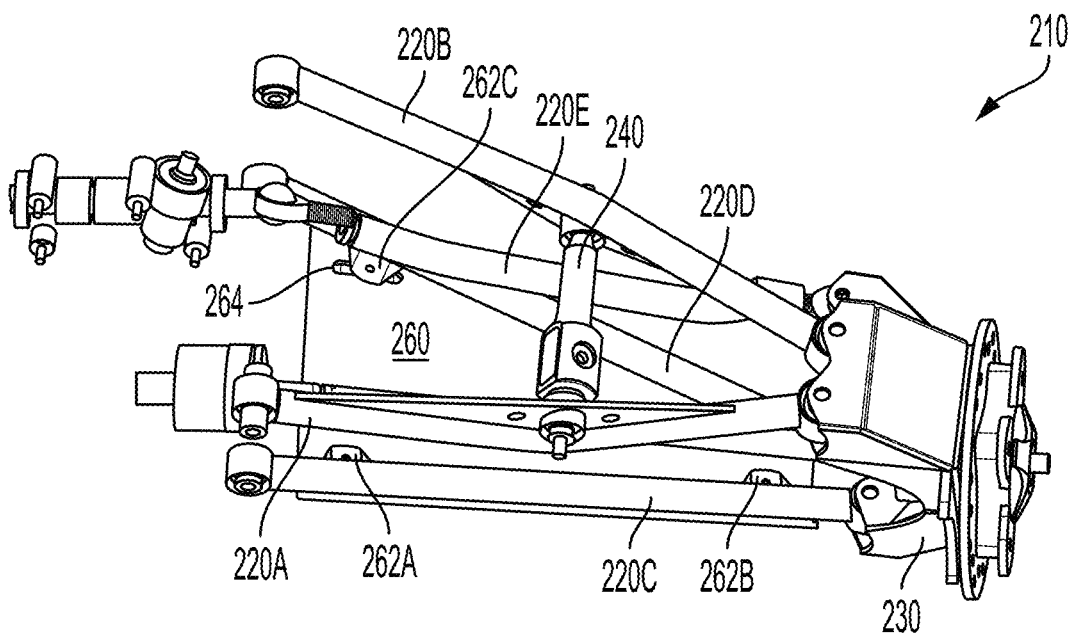
FIG. 2A is a top view of a skid plate disposed on the two lower links of a multi-link suspension system.

Thus, for example, as shown in FIG. 2A, the skid plate 260 can be fixedly attached to link 220C via first and second skid plate mounts 262A, 262B, such that the skid plate 260 is fixed in place relative to that link 220C. In some embodiments, the skid plate 260 may be attached to each of the mounts 262A, 262B via a fastener 266 that extends through a hole or aperture in the skid plate 260. Alternatively, it is contemplated that the skid plate 260 may be attached to the amounts 262A, 262B or skid plate 260 directly such as by welding them together.

It is preferred that the skid plate 260 is movably attached or coupled to the other lower link 220D. For example, in some embodiments, the skid plate 260 may be attached to a skid plate mount 262C by inserting a fastener 268 through an aperture 264 in the skid plate 260. It is preferred that the aperture 264 comprises a slot with at least a portion of the aperture/slot 264 being curved to compensate for the independent movement of each of the two lower links 220C, 220D.

Figure 2B:
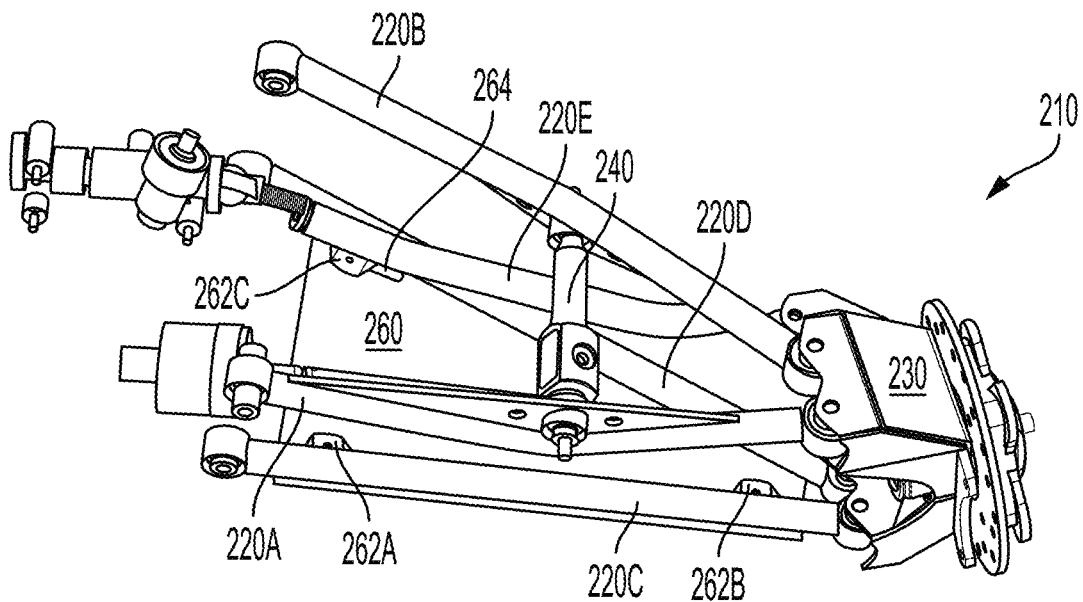
FIG. 2B is a top view of the suspension system of FIG. 2A showing movement of the skid plate when the wheel is turned inwardly.
Figure 2C:
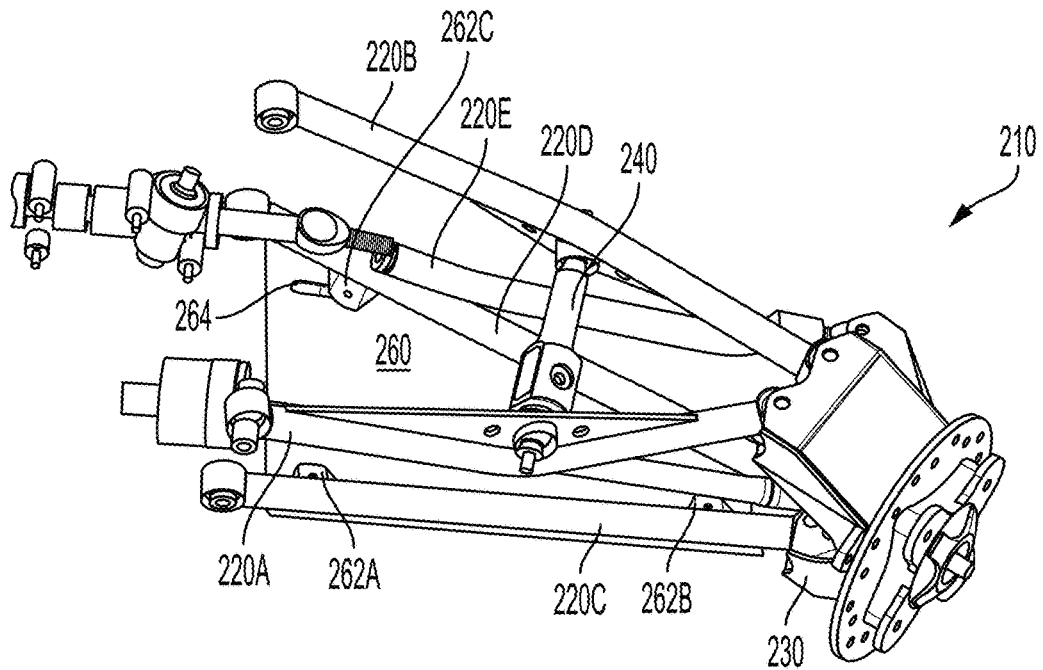
FIG. 2C is a top view of the suspension system of FIG. 2A showing movement of the skid plate when the wheel is turned outwardly.

In this manner, the skid plate 260 can move with respect to lower link 220D as the link 220D moves causing the fastener 268 to slide or move along aperture/slot 264. This can be seen by comparing FIG. 2A with FIG. 2B or FIG. 2C. In FIG. 2B, for example, the knuckle 230 is turned inwardly causing movement of the skid plate 260 toward one end of the aperture/slot 264 (here, the left end). In contrast, when the knuckle 230 is turned outwardly as shown in FIG. 2C, the skid plate moves along the aperture/slot 264 toward the other end of the aperture/slot 264 (here, the right end).

Figure 2D:
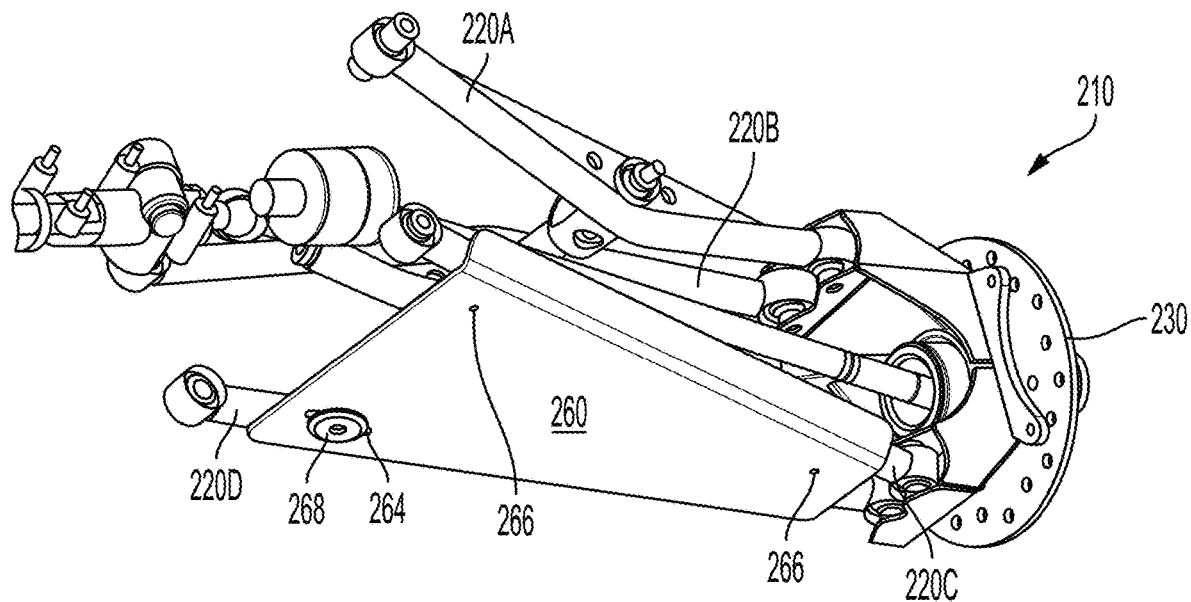
FIG. 2D is a bottom view of a skid plate disposed on the two lower links of a multi-link suspension system.
Figure 2E:
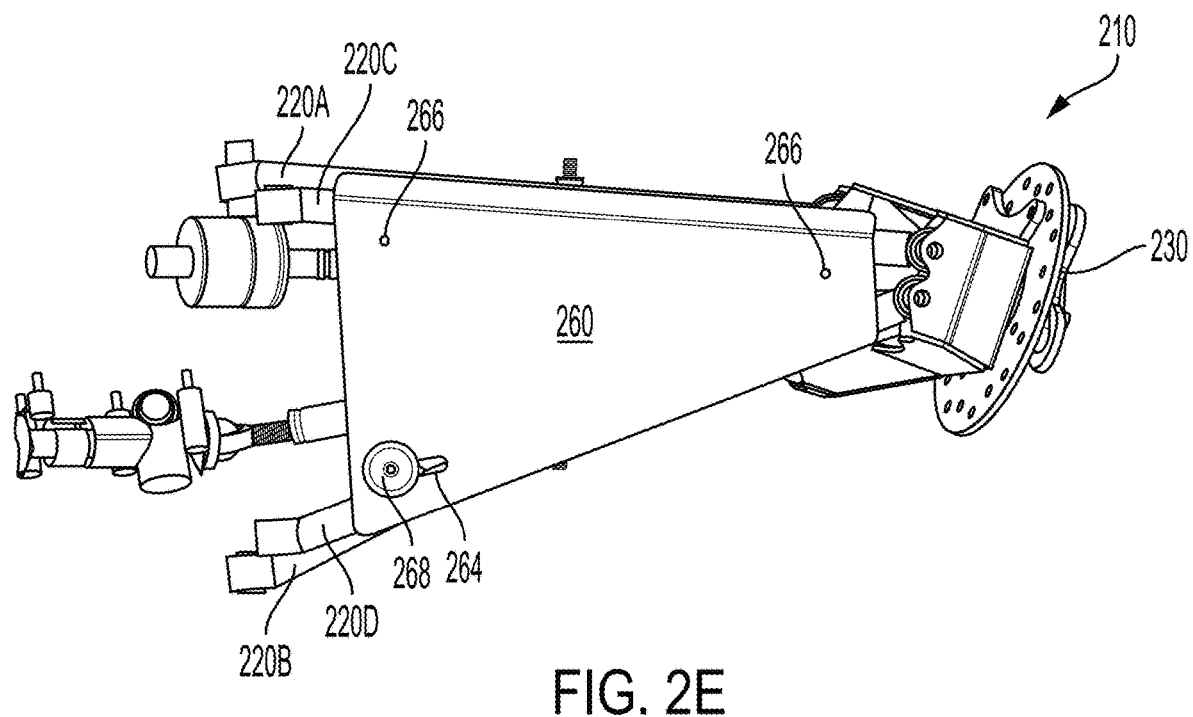
FIG. 2E is a bottom view of the suspension system of FIG. 2A showing movement of the skid plate when the wheel is turned inwardly.
Figure 2F:
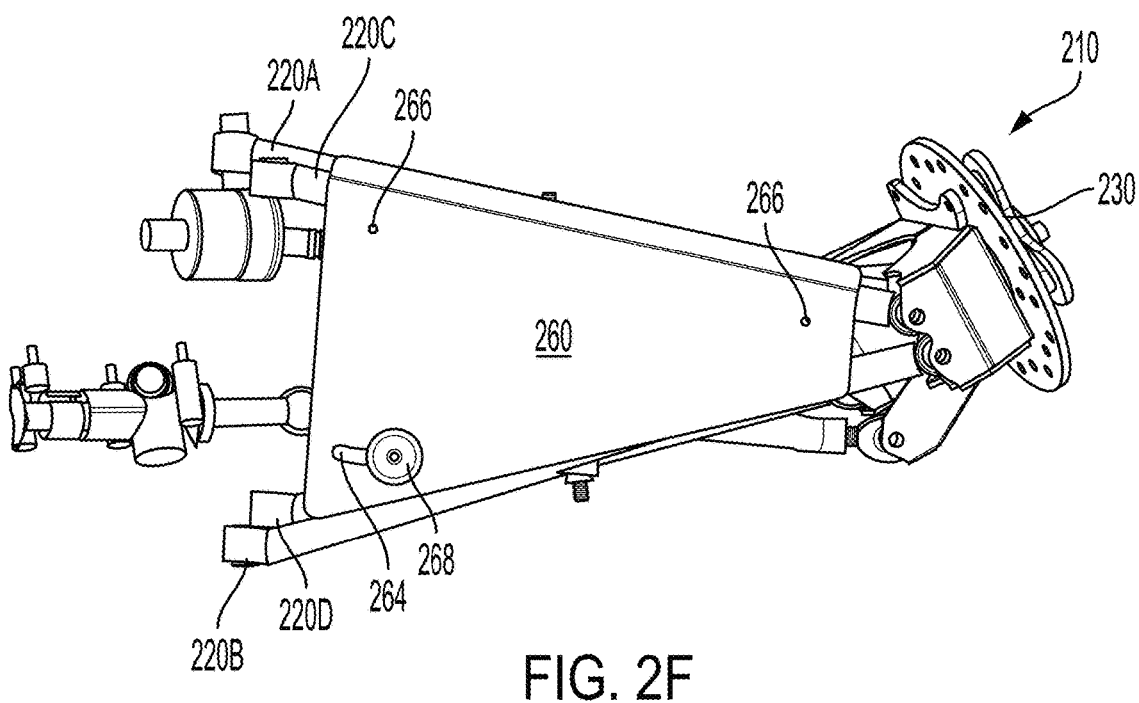
FIG. 2F is a bottom view of the suspension system of FIG. 2A showing movement of the skid plate when the wheel is turned outwardly.

Similarly, movement of the skid plate 260 with respect to link 220D can also be seen by comparing FIG. 2D with FIG. 2E or FIG. 2F. In FIG. 2E, for example, the knuckle 230 is turned inwardly causing movement of the skid plate 260 toward one end of the aperture/slot 264 (here, the left end). In contrast, when the knuckle 230 is turned outwardly as shown in FIG. 2F, the skid plate moves along the aperture/slot 264 toward the other end of the aperture/slot 264 (here, the right end).

Figure 3:
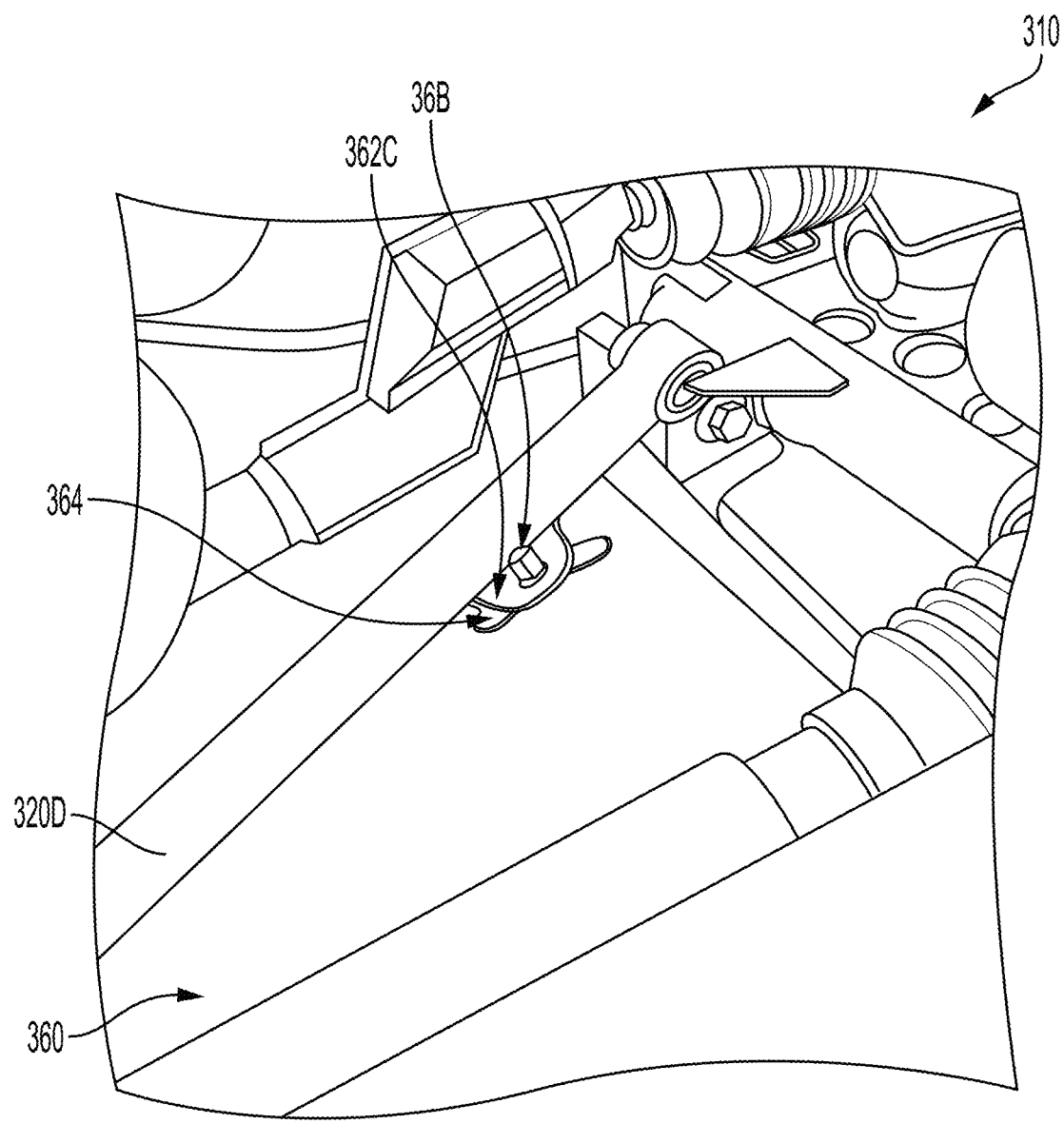
FIG. 3 is a top view of another embodiment of a skid plate disposed on the lower links of a multi-link suspension system.

FIG. 3 illustrates another embodiment of a movable skid plate 360 for a multi-link suspension system 310. The skid plate preferably comprises a slot 364 through which a fastener 368 can be inserted to couple the skid plate 360 with a mount 362C of lower link 320D. Although not shown, it is preferred that the skid plate is fixedly attached to the other lower link, such as described above.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A skid plate for a vehicle having a multi-link suspension system with at least first and second links, comprising:
a skid plate having a first aperture comprising a slot;
wherein the slot is configured to receive a first fastener that couples the skid plate to a first link of the suspension system, such that the skid plate can move with respect to the first link, with movement of the skid plate being restricted by movement of the first fastener along the slot; and
wherein the skid plate is fixedly attached to a second link of the suspension system, such that the skid plate is fixed in place relative to the second link.

2. The skid plate of claim 1, wherein the skid plate further comprises a second aperture, and wherein the second aperture is configured to receive a second fastener that attaches the skid plate to a second link of the suspension system, such that the skid plate is fixed in place relative to the second link.

3. The skid plate of claim 1, wherein the skid plate is welded or permanently attached to the second link.

4. The skid plate of claim 1, wherein the skid plate is formed from a first material comprising at least one of steel, sheet metal, aluminum, plastic/polymer materials including ultra-high molecular weight plastic, fiberglass and other commercially suitable material(s) and/or combination(s) thereof.

5. The skid plate of claim 1, wherein the skid plate is disposed below the first and second link of the suspension system.

6. The skid plate of claim 1, wherein movement of the second link causes movement of the skid plate.

7. The skid plate of claim 1, wherein the slot comprises a curved portion.

8. The skid plate of claim 1, wherein the first fastener is configured to slide along a length of the slot in response to movement of the first or second link.

9. A vehicle, comprising:
a suspension system comprising:
a first link that couples to a knuckle of the vehicle at a first end and a chassis of the vehicle at a second end;
a second link that couples to the knuckle at a first end and the chassis at a second end;
wherein the first link pivots or moves independently of the second link;
a skid plate coupled to, and disposed below, the first and second links;
wherein the skid plate comprises a slot and wherein the skid plate is coupled to the first link via a first fastener configured to be inserted through the slot, such that the skid plate can move with respect to the first link; and
wherein the skid plate is fixedly attached to the second link.

10. The vehicle of claim 9, wherein each of the first and second links couples to a distinct point of the knuckle at the first end and a distinct point of the chassis at the second end.

11. The vehicle of claim 9, wherein movement of the skid plate is restricted by movement of the first fastener along the slot.

12. The vehicle of claim 9, wherein the skid plate is composed of steel, sheet metal, aluminum, plastic/polymer materials including ultra-high molecular weight plastic, fiberglass, and other commercially suitable material(s) and/or combination(s) thereof.

13. The vehicle of claim 9, wherein the slot comprises a curved portion.

14. The vehicle of claim 9, wherein the first fastener is configured to slide along a length of the slot in response to movement of the first or second link.

15. The vehicle of claim 9, wherein the skid plate comprises a second aperture, and wherein a second fastener is configured to be inserted through the second aperture and affix the skid plate to the second link, such that the skid plate is fixed in place relative to the second link.

16. The vehicle of claim 9, wherein the skid plate is welded or permanently attached to the second link.

17. The vehicle of claim 9, wherein the first link comprises a mount, and wherein the skid plate is coupled to the first link via the mount.

* * * * *